United States Patent [19]
Facon et al.

[11] Patent Number: 5,247,281
[45] Date of Patent: Sep. 21, 1993

[54] CAPACITIVE PHASE SHIFT PROXIMITY DETECTOR

[75] Inventors: Pierre Facon, Versailles; Pierre Sajot, Beynes, both of France

[73] Assignee: Société anonyme dite Bertin & Cie, Plaisir, France

[21] Appl. No.: 909,759

[22] Filed: Jul. 7, 1992

[30] Foreign Application Priority Data

Jul. 8, 1991 [FR] France ............................. 91 08547

[51] Int. Cl.⁵ ............................................. G08B 13/26
[52] U.S. Cl. ....................................... 340/562; 331/65; 340/561
[58] Field of Search ..................... 340/562, 561; 331/65

[56] References Cited
U.S. PATENT DOCUMENTS 4,091,371 5/1978 Mason Jr. et al. ................ 340/562
4,169,260 9/1979 Bayer ................................ 340/562

FOREIGN PATENT DOCUMENTS 2461990 2/1981 France .
2606162 5/1988 France .
2609823 7/1988 France .

Primary Examiner—Glen R. Swann, III
Attorney, Agent, or Firm—Watson, Cole, Grindle & Watson

[57] ABSTRACT

This detector comprises a variable radio frequency oscillator (1) producing a first electrical signal, a transmission circuit (3) with a capacitive antenna to which said first signal is applied, a reception circuit (6) forming, with the transmission circuit (3), a selective coupler for picking up a second electrical signal at the frequency of the oscillator, and a circuit (9) for comparing the phases of the first and second electrical signals and producing an output signal in response to a variation of the phase shift between said signals due to the presence in the surroundings of the antenna of a foreign body to be detected.

The detector further comprises a feedback circuit (13) driven by the output signal of the comparison circuit (9) and controlling the oscillator (1) in order to make the frequency of the first signal vary in the sense which tends to cancel out said variation of the phase shift.

12 Claims, 3 Drawing Sheets

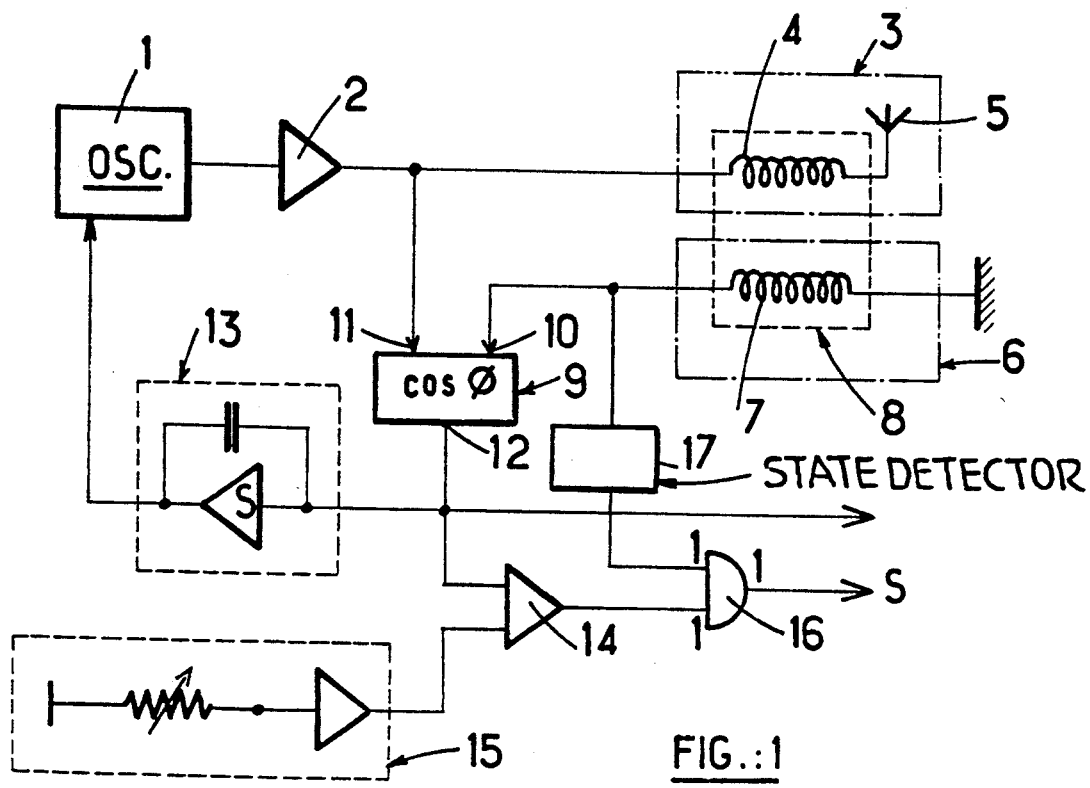
FIG.:1
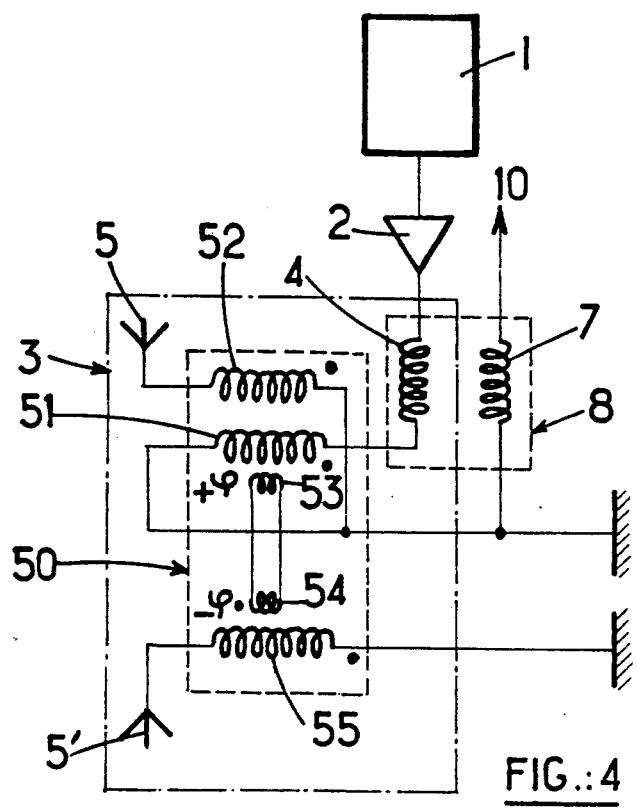
FIG.:4

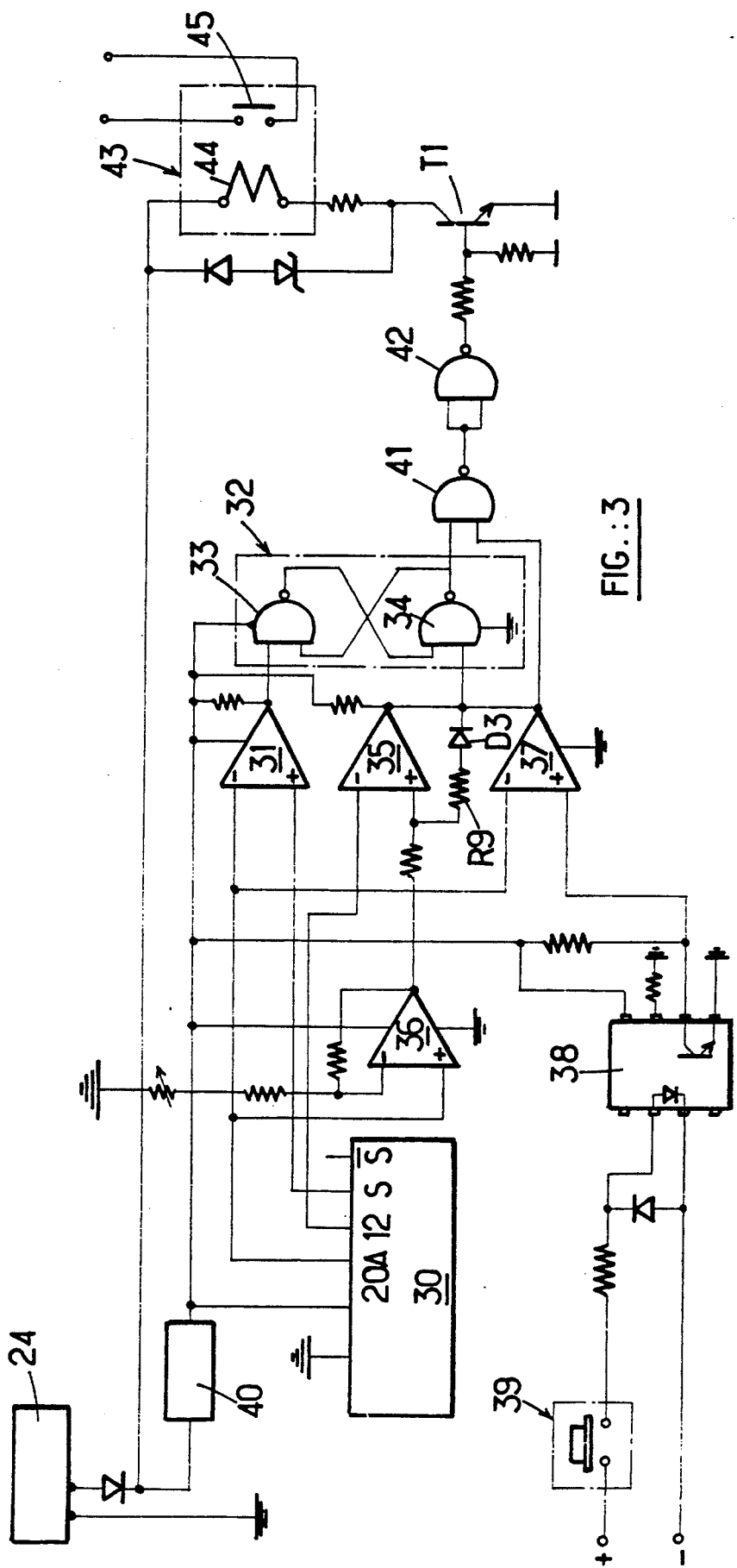
FIG.:3

CAPACITIVE PHASE SHIFT PROXIMITY DETECTOR

BACKGROUND OF THE INVENTION

The present invention relates to a proximity detector, intended especially for detection of obstacles in proximity to a moving object such as a wire-guided trolley, robot, machine element or for the detection of intrusion into a premises.

The French Patent Application FR-A-2 606 162 describes such a detector in which a tuned transmission circuit with a capacitive antenna is excited by a radio frequency oscillator producing a high-frequency excitation signal. Reception means comprising a coil, forming a selective coupler with a coil of the transmission circuit, pick up an electrical signal at the frequency of the oscillator, whose amplitude is a function of the tuning of the transmission circuit. When a sufficiently conductive body is placed at a distance from the antenna sufficient to modify the capacitance of the latter, a demodulator connected to the reception means detects a variation of the peak-to-peak voltage of the signal delivered by the reception means and produces an output signal which is a function of the distance from the antenna to the foreign body.

Such a detector has the advantage of relying on very simple technology and of thereby being inexpensive. However, it requires, for its implementation, precise zero setting, that is to say that the transmission circuit must be perfectly tuned to the frequency of the oscillator, failing which the distance measurement supplied by the output signal is marred by errors. Moreover, this measurement is also affected during the lifetime of the detector by drifts of all types (thermal, voltage, capacitance variation of the antenna, etc.) to which the various components of the detector are inevitably subjected. In practice, it turns out to be tricky to compensate for these various drifts, without reverting to relatively complex techniques which add excessively to the cost of the detector.

SUMMARY OF THE INVENTION

The invention aims to resolve this problem by providing a proximity detector of a type similar to that described in the abovementioned document and which, while preserving the technical simplicity of the latter, makes it possible to be rid of any zero-setting problem on implementation or in the course of operation by reason of the drifts of the various components.

To this end, the subject of the invention is a proximity detector with capacitive antenna for detecting the presence of a foreign body in the surroundings of said antenna, comprising:

a variable radio frequency oscillator producing a first electrical signal, a transmission circuit comprising said capacitive antenna and to which said first signal is applied, a reception circuit forming, with said transmission circuit, a selective coupler for picking up a second electrical signal at the frequency of said oscillator, detection means comprising a phase comparator circuit for comparing the phases of said first and second electrical signals and producing an output signal in response to a variation of the phase shift between said signals resulting from detuning of said transmission circuit, and a feedback circuit driven by said output signal from said comparison circuit and controlling said oscillator in order to make the frequency of said first signal vary in the sense which tends to tune said transmission circuit by cancelling out said variation of the phase shift, said feedback circuit comprising an integrator circuit with a high time constant compared to the range of relative speeds of movement of the antenna with respect to the foreign body.

The oscillator is consequently slaved in such a way as to automatically latch onto the tuning frequency and permit resetting close to zero for any slow drift, in particular thermal drift. On the other hand, it allows relatively rapid variations such as the approach of a vehicle towards an obstacle. This proximity detector is thus sensitive, not to the distance to the obstacle, but to the relative speed between the latter and the antenna. The automatical latch onto the tuning frequency has the important advantage of providing a height sensibility, since the phase shifts between transmission and reception circuits are relevant only in the close vicinity of the tuning.

According to a characteristic of the invention, said phase comparator circuit produces an output signal which is a function of the phase shift between said first and second signals. Preferably, said transmission and reception circuits present signals in quadrature when said transmission circuit is in tune and said phase comparator circuit produces an output signal proportional to the cosine of the phase shift between said first and second signals. Hence, in the absence of an obstacle, the first and second signals are in quadrature and the output signal produced by the phase comparator is nil.

BRIEF DESCRIPTION OF THE DRAWING

Other characteristics and advantages of the invention will emerge from the description which follows, given solely by way of example and illustrated by the attached drawings in which:

FIG. 1 is a block diagram of the detector according to the invention;

FIG. 3 is an electrical diagram of a detector according to FIG. 2 more particularly adapted to a moving object such as a wire-guided trolley, and FIG. 4 is an electrical diagram of the transmission circuit of the proximity detector of FIG. 1 more particularly adapted to a device comprising two matching movable metal parts capable of relative movements with respect to one another.

DESCRIPTION OF THE PREFERRED EMBODIMENTS

Figure 2:
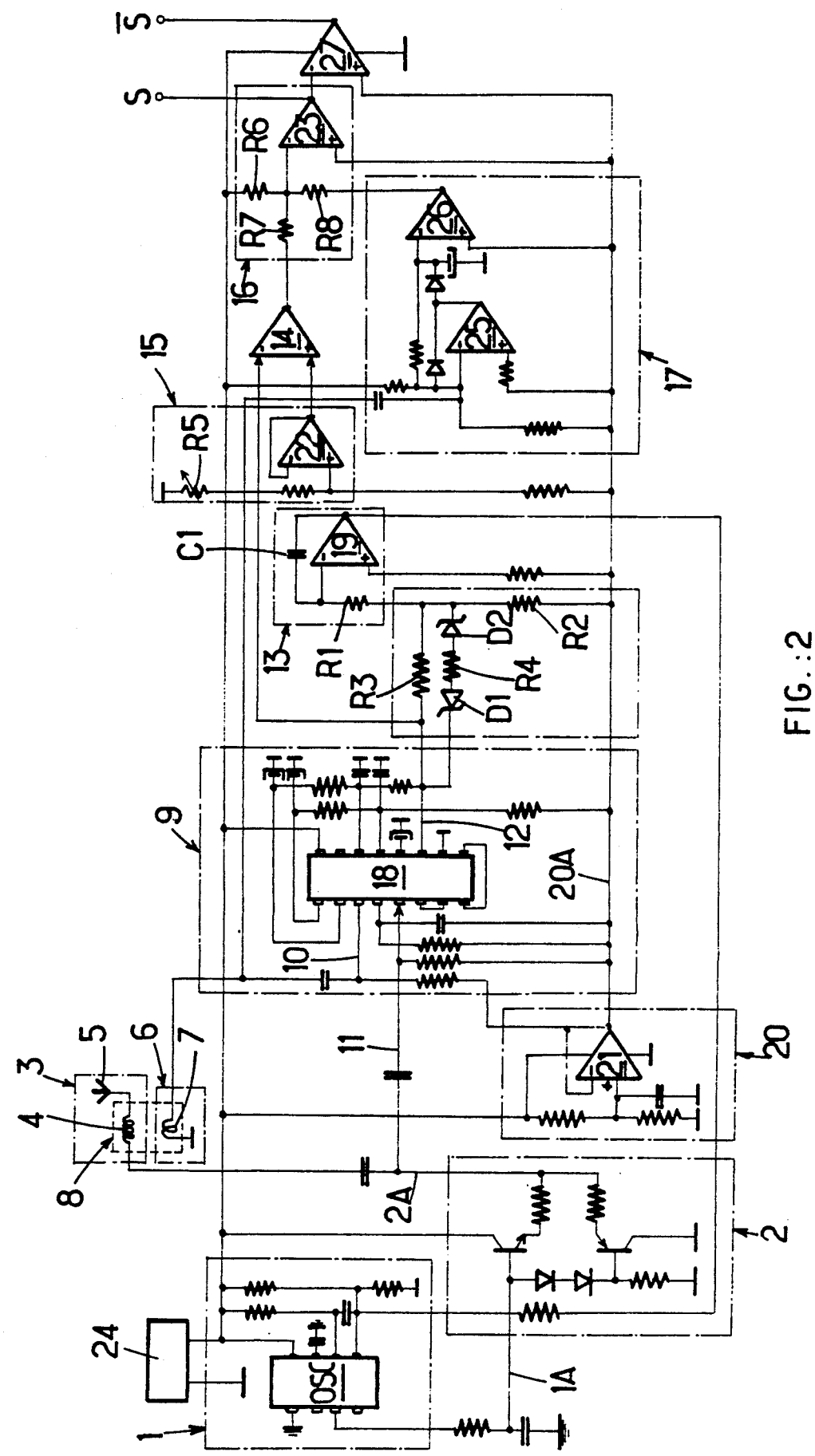
FIG. 2 is an electrical diagram of a particular form of embodiment of the proximity detector in accordance with the invention.

Referring to FIG. 1, the proximity detector comprises a radio frequency oscillator 1 producing an electrical signal whose frequency is variable between, for example, 150 and 400 KHz. This signal, after amplification by a radio frequency amplifier 2, is applied to a transmission circuit 3 comprising a first coil 4 and a capacitive radiating antenna 5 constituted, preferably by an electrically conductive wire or sheet. The design of the transmission circuit 3 does not require any previous tuning within a large range of values of the antenna capacity and, therefore, any calibration when implementing the detector. A reception circuit 6, comprising a second coil 7 constituting a selective coupler 8 with the first coil 4, pick up an electrical signal at the frequency of the oscillator 1. When the transmission circuit 3 is in tune, the signal picked up on the coil 7 is phase-shifted by $\pi/2$ with respect to the signal supplied to the coil 4.

The coil 7 is connected on the one hand to earth, and on the other hand to an input 10 of a phase comparator circuit 9 which receives, on another input 11, the output signal from the amplifier 2, that is to say the signal applied to the transmission circuit 3. The phase comparator circuit 9 produces, at its output 12, a DC voltage which is proportional to the cosine of the phase shift between the signals applied to its inputs 10 and 11.

The output signal of the comparator 9 is applied to the input of an integrator circuit 13 with a high time constant whose output drives the oscillator 1 so as to make its frequency vary in the sense which tends to cancel out the cosine of the phase shift between the signals applied to the inputs 11 and 10. The signal at the output 12 of the phase comparator 9 is also compared in a comparator 14 to a threshold voltage which is fixed by a threshold voltage generator circuit 15. The output of the comparator 14 is connected to one of the inputs of an AND gate 16 whose other input is connected t the input 10 of the comparator 9 by a state detector circuit 17 which compares the peak-to-peak amplitude of the signal produced by the reception circuit 6 with a threshold value and whose output changes its logic state if this peak-to-peak value is less than the threshold value, thus indicating an operating anomaly.

In the absence in the surroundings of the antenna 5 of a moving foreign body or obstacle capable of varying the electrical field which the antenna emits, the circuit 3 is tuned due to the feedback circuit between the phase comparator 9 and the oscillator 1 and the signals outputted from the amplifier 2 and the reception circuit 6 are in quadrature. The signal at the output 12 of the phase comparator 9 is nil or very close to nil, and consequently the integrator circuit 13 applies no correction to the oscillator 1. On the other hand, the signal at the output 12 is less than the threshold fixed by the generator 15 and the comparator 14 presents, at its output, a high state corresponding to a logic "1" state. The other input of the AND gate 16 also receives from the detector circuit 17 a logic "1" state as, in the absence of operating anomaly, the transmission circuit being substantially tuned, the peak-to-peak amplitude of the signal induced in the coil 7 is greater than the threshold fixed in the circuit 17. The AND gate 16 therefore presents, at its output, a logic "1" state.

When a foreign body moving within the surroundings of the antenna 5 gives rise to a variation in the electric field which the antenna transmits, which is equivalent to a variation of its apparent capacitance, a displacement of the tuning frequency of the transmission circuit 3 is produced. The phase shift between the voltage generated at the terminals of the coil 7 and the excitation voltage of the transmission circuit 3 is modified and the cosine of the phase shift is no longer nil. This phase variation is converted by the comparator 9 into a DC voltage whose value varies with the relative speed of movement of the antenna 5 with respect to the foreign body. If said relative speed is high enough, the voltage of the output 12 of the comparator 9 exceeds the voltage threshold applied to the other input of the comparator 14, the output of the latter passes from the "1" state to the "0" state, and similarly for the output of the AND gate 16. This change in logic state of the output of the AND gate 16 is therefore representative of the presence of a foreign body in the surroundings of the antenna 5.

The range of the detector is variable as a function of the geometry of the antenna and of the foreign body nature. It is generally less than 1 meter, which limits the detector to the detection of close obstacles.

The time constant of the integrator circuit 13 is chosen to be sufficiently high so that the frequency correction effected by the oscillator 1 is, under normal conditions of use, insufficient to latch onto the detuning of the transmission circuit 3 during the mutual coming together of the antenna 5 and a foreign body.

If a foreign body is detected and if its relative movement with respect to the antenna 5 is stopped while this obstacle is still in the surroundings of the antenna, the correction applied by the feedback circuit 13 tends to progressively bring the frequency of the signal transmitted by the oscillator 1 to the value corresponding to the tuning of the transmission circuit 3 (whose apparent capacity is modified by the immobile presence of the foreign body or obstacle). Consequently, after a certain time, the cosine of the phase shift comes back to a value which is less than the threshold applied to the comparator 14. The output of the latter, as well as that of the AND gate 16, therefore comes back to logic "1" state. In order to inhibit this return to the initial state whilst a foreign body is still in proximity to the antenna 5, a logic circuit for memorizing the tripping of the output of the AND gate 16 can be provided behind the latter as will be explained in more detail later.

Finally, in the event of an anomaly in the operation of the transmission circuit 3, of the reception circuit 6, or of the associated electrical circuits, the peak-to-peak amplitude of the signal at the terminals of the coil 7 passes below the threshold value fixed in the state detector circuit 17 and the output of the latter, as well as that of the AND gate 16, passes to the logic "0" state.

The detector of FIG. 1 makes it possible both to detect, dynamically, the proximity of a foreign body and the operating anomalies of the detector itself. Further, it provides for an automatic zero adjustment on implementation and during operation.

The electrical diagram of FIG. 2 shows a particular form of embodiment of the proximity detector of FIG. 1. According to this diagram, the oscillator 1 is produced from an integrated circuit NE 566 which, via line 1A, feeds the amplifier 2. The amplifier 2 is of a conventional transistor type and its output 2A feeds the previously described transmission circuit 3 and the input 11 of the phase comparator 9 produced from a multiplier 18 which can be constituted by an integrated circuit of the XR 2208 type. The circuit 18 receives, on its input 10, the signal produced by the coil 7 of the reception circuit 6.

The output 12 of the circuit 18 feeds the input of the integrator 13 constituted conventionally by an operational amplifier 19 whose inverting input is connected to its output by means of a capacitor C1. The inverting input of the circuit 19 is connected by means of series resistors R1 and R2 to the output of a generator 20 which produces, on its output 20A, a common internal reference voltage for the various circuits of the detector. The internal reference voltage generator 20 is constituted from an operational amplifier 21.

The output 12 of the circuit 18 is connected to the joining point between the resistors R1 and R2 by the parallel mounting of a first circuit comprising a resistor R3 and of a second circuit comprising two Zener diodes D1 and D2 mounted head-to-tail on either side of a resistor R4. The parallel circuits comprising the resistors R3 and R4 form, with the resistor R2, a variable voltage divider with the voltage produced at the output 12 of the circuit 18. By way of example, the resistors R3 and R4 can respectively have values of 150 KΩ and 4.7 KΩ the resistor R3 being in circuit as long as the voltage present at the output 12 remains less than about 3 Volts, the resistor R4 being in circuit beyond this value. This variable voltage divider makes it possible to accelerate the adjustment of the tuning on switch-on, then to produce the slow latching onto the drifts in the normal working range of the circuit.

The output 12 of the circuit 18 also feeds the inverting input of an operational amplifier constituting the comparison circuit 14. The circuit 15 for fixing the comparison threshold is constituted from an operational amplifier 22 whose output is connected to the noninverting input of the comparison circuit 14. An adjustable resistor R5 connected in the biasing circuit of the noninverting input of the circuit 22 makes it possible to adjust the value of the comparison threshold applied to the noninverting input of the circuit 14.

The AND logic gate 16 is constituted from an operational amplifier 23 whose noninverting input is connected to the internal reference voltage output 20A of the circuit 20 and whose inverting input is connected by means of resistors R6, R7 and R8 respectively to one of the terminals of the power supply source 24 of the detector, to the output of the comparator circuit 14 and to the output of the state detector circuit 17.

The state detector circuit 17 comprises an operational amplifier 25 mounted as a peak voltage measuring device whose output feeds the inverting input of an amplifier 26 mounted as a comparator. The noninverting input of the amplifier 26 is connected to the output 20A of the internal reference voltage generator 20. The signal S present at the output of the operational amplifier 23 represents the output logic state of the AND gate 16, and an operational amplifier 27 mounted as an invertor at the output of the amplifier 23 makes it possible to produce a complementary output S.

Referring now to FIG. 3, the set of circuits of FIG. 2 is represented by the block 30.

The output S of the circuit 30 feeds the noninverting input of an operational amplifier 31 whose inverting input is connected to the internal reference voltage output 20A. The output of the operational amplifier 31 is connected to the "SET" input of a memory 32 of the trip state constituted by a RS flip-flop formed conventionally from two "NAND" gates 33 and 34.

Another operational amplifier 35 is connected by its inverting input to the output 12 of the circuit 18 of FIG. 2 and by its noninverting input to an operational amplifier 36 generating a reference voltage. A series circuit constituted by a resistor R9 and by a diode D3 is mounted in parallel between the noninverting input and the output of the operational amplifier 35.

Another operational amplifier 37 is connected by its inverting input to the internal reference voltage output 20A and by its noninverting input to a manual rearming control circuit 38 constituted, for example, by an integrated circuit 6N 139. A control voltage can be selectively applied by an appropriate means such as a push button 39 between two inputs of the circuit 38. The application of this voltage to the input of the circuit 38 brings about the earthing of the noninverting input of the circuit 37 while, when the push button 39 is not actuated, the noninverting input of the circuit 37 is at the supply voltage delivered by a voltage regulator 40 connected between the supply source 24 and the biasing terminals of the circuit 30 and of the other circuits of FIG. 3.

The outputs of the circuits 35 and 37 are connected to the "RESET" input of the RS flip-flop 32 and, moreover, the output of the circuit 37 is connected to one of the inputs of a "NAND" gate 41 whose other input is connected to the output of the RS flip-flop 32. The output of the "NAND" gate 41 is connected to the two inputs of another "NAND" gate 42 mounted as an invertor and whose output feeds the base of a transistor T1 whose emitter-collector junction is connected in series, between the power supply source 24 and earth, with the winding 44 of a relay 43 whose movable contact 45 controls the motorizing means (not represented), such as an electric motor, of the device on which the proximity detector, described above in respect of FIG. 3, is mounted. The circuit which has just been described is particularly suitable for the control of a motorized device such as a wire-guided trolley.

In the absence of an obstacle in the surroundings of the antenna 5, the output of the circuit 31 is at a voltage corresponding to a logic "1" state and the same is true of the output of the RS flip-flop 32. The output of the circuit 37 is also in the "1" state so that the output of the "NAND" gate 41 is in the "0" state, that of the "NAND" gate 42 in the "1" state. The transistor T1 is then conducting, the winding 44 is powered and the movable contact 45 is closed so that the motorizing means can be supplied normally.

In the event of detection of an obstacle, the output S of the block 30 passes from 1 to 0 and the output of the circuit 31 also trips from 1 to 0. The output of the flip-flop 32 changes state, as do the outputs of the "NAND" gates 41 and 42, and the transistor T1 is turned off. The winding 44 is no longer powered and the movable contact 45 opens, thus interrupting the supply of the motorizing means. However, due to the fact that there is no further relative movement between the obstacle detected and the antenna 5, the transmission circuit comes progressively back into tune by reason or the presence of the feedback circuit 13 and the signal S comes back to the "1" state. The output of the circuit 31 passes back to the "1" state, but the RS flip-flop 32 does not change state and preserves the memory of the initial tripping. The transistor T1 therefore remains turned off.

In order to make the output of the flip-flop 32 come back to the "1" state, it is appropriate to apply a "0" state to the input of the "NAND" gate 34 which is connected to the outputs 35 and 37. If the obstacle which is in the surroundings of the antenna 5 is withdrawn, the output of the circuit 35 passes from the "1" state to the "0" state by reason of the variation induced on the signal at the output 12 (sign change). The output of the flip-flop 32 can then pass back to the "1" state and consequently the transistor T1 is made conducting, the relay 45 closes and the motorizing means can be powered normally.

However, even if the obstacle is not removed from the surroundings of the antenna, it is possible to carry on with manual rearming by pressing on the push button 39. This has the effect of putting the noninverting input of the circuit 37 to earth and therefore its output passes to 0. The output of the flip-flop 32 therefore passes to the "1" state but the transistor T1 remains turned off as the output of the circuit 37 is then at the "0" state. It is only when the push button 39 is released that the output of the circuit 37 comes back to the "1" state and that the transistor T1 is again powered. This arrangement makes it possible to provide excellent operating safety for the proximity detector in the application in question.

FIG. 4 illustrates an embodiment of the transmission circuit 3. If the antenna 5 is mounted in a metal part which is movable with respect to another metal part which does not constitute an obstacle to be detected, they cannot approach one another beyond a certain threshold since, in the absence of an appropriate arrangement, the detector will perceive the other metal part as an obstacle: such is the case especially if the detector is applied to the automatic opening and closing of doors whose frame and moving part are metal.

The transmission circuit of FIG. 4 makes it possible to alleviate this drawback due to the fact that it comprises a second antenna 5' coupled in phase opposition to the antenna 5 by means of an impedance transformer 50.

The coil 4 is coupled to the antenna 5 by means of the primary 51 of the transformer and by a coil 52 connected between the antenna 5 and earth. The primary 51 is also coupled to a coil 53 connected in series with a coil 54. The coil 54 is coupled to the antenna 5' by means of a coil 55 connected between the antenna 5' and earth. The coils 53 and 54 are coupled in phase opposition with the coils 51 and 55 respectively.

The antennae 5 and 5' are mounted respectively in the movable metal parts with respect to one another, for example the moving part and the frame of a door. When the two parts approach each other, the phase shift $+\phi$ introduced by the variation of the apparent capacitance of the antenna 5 (due to the metal part in which the antenna 5' is mounted), is compensated for by the phase shift introduced for the same reason by the antenna 5'. The transmission circuit 3 is therefore not detuned and the two metal parts housing the antennae 5 and 5' can approach each other until they come into mutual contact.

On the other hand, the variant of FIG. 4 makes it possible to detect, as described above, an obstacle present in the vicinity of the antennae 5 and 5' as the latter do not have symmetric relative movement with respect to the obstacle.

We claim:

1. Proximity detector with capacitive antenna for detecting the presence of a foreign body in the surroundings of said antenna, comprising:
   a variable radio frequency oscillator producing a first electrical signal,
   a transmission circuit comprising said capacitive antenna and to which said first signal is applied,
   a reception circuit forming, with said transmission circuit, a selective coupler for picking up a second electrical signal at the frequency of said oscillator,
   detection means comprising a phase comparator circuit for comparing the phases of said first and second electrical signals and producing an output signal in response to a variation of the phase shift between said signals resulting from detuning of said transmission circuit, and
   a feedback circuit driven by said output signal from said comparator circuit and controlling said oscillator in order to make the frequency of said first signal vary in the sense which tends to tune said transmission circuit by cancelling out said variation of the phase shift, said feedback circuit comprising an integrator circuit with a high time constant compared to the range of relative speeds of movement of the antenna with respect to said foreign body to be detected.

2. Detector according to claim 1, in which said phase comparator circuit produces an output signal which is a function of the phase shift between said first and second signals.

3. Detector as claimed in claim 2, in which said transmission and reception circuits are coupled in order to present signals in quadrature when said transmission circuit is in tune and wherein said phase comparator circuit produces an output signal proportional to the cosine of the phase shift between said first and second signals.

4. Detector according to claim 2, comprising a first threshold comparator for comparing said output signal with a predetermined threshold voltage and presenting, as output, one of two logic states, one representative of the presence of a foreign body, the other of the absence of a foreign body in the surroundings of the antenna.

5. Detector according to claim 4, comprising a state detector circuit connected to said reception circuit for delivering an alarm signal representative of an abnormal operating state of said detector when the amplitude of said second signal is less than a predetermined value.

6. Detector according to claim 5, in which said state detector comprises a peak voltage measuring device connected to said reception circuit and a second threshold comparator for comparing the output voltage from said peak voltage measuring device with a second predetermined threshold voltage which is representative of said predetermined value, said second comparator presenting, as output, one of two logic states, one representative of said abnormal operating state, the other of a normal operating state of said detector.

7. Detector according to claim 6, comprising a logic circuit connected at its input to the outputs of said threshold comparators and delivering a first output logic state in response to the application on its inputs of compator output which is representative of the presence of a foreign body and/or of a compator output which is representative of an abnormal operating state of the detector, and a second output logic state in the absence on its inputs of one or the other of these two comparator outputs from said threshold comparators.

8. Detector according to claim 7, comprising a second logic circuit with a state memory to which is applied an input which is representative of the output logic state from said first sited logic circuit, a motorized device, a motorizing control circuit for said motorized device driven by said second logic circuit, said second logic circuit being adapted to trip from a state of authorizing to a state of inhibiting operation of said motorizing control circuit in response to the application, by said first-recited logic circuit, of an input which is representative of the presence of a foreign body, and at least one rearming circuit connected to said second logic circuit to make it trip into said state of authorizing operation of said motorizing control circuit in response to a rearming control signal.

9. Detector according to claim 8, in which said rearming circuit comprises a third threshold comparator adapted for comparing said output signal from said phase comparator circuit with a third threshold voltage and whose output changes from a first to a second state in response to a variation of said output signal from said phase comparator circuit which is representative of the removal of said foreign body away from the surroundings of said antenna.

10. Detector according to claim 9, in which said rearming circuit comprises an manual control circuit for forcing the output of said rearming circuit into said second state.

11. Detector according to claim 10, in which the outputs from said third threshold comparator and said manual control circuit are connected in parallel to a rearming input of said second logic circuit.

12. Detector according to any one of claims 1 to 11, in which said transmission circuit comprises two antennae arranged respectively in two metal parts capable of exhibiting relative movements with respect to one another, said antennae being coupled to one another in phase opposition by means of an impedance transformer.

* * * * *